(12) United States Patent
Lee (10) Patent No.: US 9,031,741 B2
(45) Date of Patent: May 12, 2015

(54) SYSTEM AND METHOD FOR CONTROLLING OIL PUMP

(71) Applicants: Hyundai Motor Company, Seoul (KR); Kia Motors Corporation, Seoul (KR)

(72) Inventor: Sungha Lee, Chungju-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 305 days.

(21) Appl. No.: 13/708,639

(22) Filed: Dec. 7, 2012

(65) Prior Publication Data
US 2014/0100739 A1  Apr. 10, 2014

(30) Foreign Application Priority Data
Oct. 4, 2012 (KR) ............... 10-2012-0110027

(51) Int. Cl.
*G06F 7/00* (2006.01)
*B60W 10/30* (2006.01)
*B60W 10/06* (2006.01)
*F01M 1/16* (2006.01)

(52) U.S. Cl.
CPC ............ *B60W 10/30* (2013.01); *B60W 10/06* (2013.01); *F01M 1/16* (2013.01); *F01M 2250/64* (2013.01)

(58) Field of Classification Search
USPC ......... 701/36, 67, 102, 22, 99, 66, 54, 59, 58, 701/51, 14, 41; 180/65
See application file for complete search history.

(56) References Cited

U.S. PATENT DOCUMENTS

| | | | | |
|---|---|---|---|---|
| 4,626,994 A * | 12/1986 | Yabe et al. | ..................... | 701/41 |
| 5,069,083 A * | 12/1991 | Hirano et al. | ................... | 477/39 |
| 6,110,072 A * | 8/2000 | Harada et al. | ................ | 477/157 |
| 6,135,919 A * | 10/2000 | Shimakura | ................ | 477/157 |
| 6,182,625 B1 * | 2/2001 | Ozeki et al. | ................ | 123/90.33 |
| 6,186,750 B1 * | 2/2001 | Hunter | ................ | 417/307 |
| 6,206,651 B1 * | 3/2001 | Klaus et al. | ................ | 417/287 |
| 6,237,322 B1 * | 5/2001 | Rago | ................ | 60/39.08 |
| 6,247,904 B1 * | 6/2001 | Miyazaki et al. | ........... | 417/310 |
| 6,249,727 B1 * | 6/2001 | Muller | ................ | 701/36 |
| 6,253,137 B1 * | 6/2001 | Abo et al. | ................ | 701/51 |
| 6,260,533 B1 * | 7/2001 | Tanaka | ............. | 123/196 R |
| 6,478,642 B1 * | 11/2002 | Kolb et al. | ................ | 440/88 R |
| 6,556,910 B2 * | 4/2003 | Suzuki et al. | ................ | 701/54 |
| 6,807,470 B2 * | 10/2004 | Hara | ................ | 701/36 |
| 7,287,507 B2 * | 10/2007 | Futamura et al. | ......... | 123/196 R |
| 7,395,803 B2 * | 7/2008 | Ledger et al. | ............ | 123/196 R |

(Continued)

FOREIGN PATENT DOCUMENTS

| | | |
|---|---|---|
| KR | 1020100072473 A | 7/2010 |
| KR | 1020110073082 A | 6/2011 |
| WO | WO 2007/060948 A1 | 5/2007 |

*Primary Examiner* — Thomas G Black
*Assistant Examiner* — Robert Payne
(74) *Attorney, Agent, or Firm* — Morgan, Lewis & Bockius LLP (57) ABSTRACT

Disclosed are an oil pump control system and method, the oil pump control method including setting an initial target oil pressure of the oil pump based on a rotation speed of an engine or an oil temperature, determining a pressure compensation value by considering the target torque or target fuel quantity of the engine based on the initial target oil pressure, determining a final target oil pressure by adding the pressure compensation value to the initial target oil pressure, and feedback-controlling the oil pump so that current oil pressure measured in real time follows the final target oil pressure.

17 Claims, 8 Drawing Sheets

(56) References Cited

U.S. PATENT DOCUMENTS

| | | | |
|---|---|---|---|
| 7,617,025 B2* | 11/2009 | Yamamoto et al. | 701/14 |
| 7,699,738 B2* | 4/2010 | Oomura | 475/114 |
| 8,155,834 B2* | 4/2012 | Murahashi | 701/36 |
| 8,155,848 B2* | 4/2012 | Kobayashi et al. | 701/66 |
| 8,160,773 B2* | 4/2012 | Nabeshima et al. | 701/36 |
| 8,428,818 B2* | 4/2013 | Murahashi et al. | 701/36 |
| 8,744,653 B2* | 6/2014 | Hase et al. | 701/22 |
| 2002/0107103 A1* | 8/2002 | Nakamori et al. | 475/116 |
| 2002/0193206 A1* | 12/2002 | Matsubara et al. | 477/157 |
| 2003/0171867 A1* | 9/2003 | Nakamori et al. | 701/54 |
| 2006/0171818 A1* | 8/2006 | Kato | 417/302 |
| 2006/0190145 A1* | 8/2006 | Yamamoto et al. | 701/22 |
| 2007/0224062 A1* | 9/2007 | Oomura | 417/440 |
| 2007/0244841 A1* | 10/2007 | Vatchkov et al. | 706/16 |
| 2008/0228373 A1* | 9/2008 | Akimoto | 701/102 |
| 2009/0132116 A1* | 5/2009 | Tanaka et al. | 701/36 |
| 2009/0271079 A1* | 10/2009 | Kobayashi et al. | 701/51 |
| 2010/0174429 A1* | 7/2010 | Hase et al. | 701/22 |
| 2010/0191417 A1* | 7/2010 | Murahashi et al. | 701/36 |
| 2011/0082630 A1* | 4/2011 | Kawaguchi et al. | 701/58 |
| 2011/0144848 A1* | 6/2011 | Yoshizue et al. | 701/22 |
| 2011/0166727 A1* | 7/2011 | Light et al. | 701/22 |
| 2011/0190990 A1* | 8/2011 | Nedachi et al. | 701/51 |
| 2011/0190996 A1* | 8/2011 | Nedachi et al. | 701/67 |
| 2011/0213521 A1* | 9/2011 | Ito et al. | 701/22 |
| 2011/0276240 A1* | 11/2011 | Fujiwara et al. | 701/59 |
| 2012/0073531 A1* | 3/2012 | Urushihata | 123/90.15 |
| 2012/0085441 A1* | 4/2012 | Park et al. | 137/565.11 |
| 2012/0141297 A1* | 6/2012 | Jeong et al. | 417/5 |
| 2012/0209480 A1* | 8/2012 | Hamane et al. | 701/54 |
| 2013/0048106 A1* | 2/2013 | Lee et al. | 137/492.5 |
| 2013/0054058 A1* | 2/2013 | Hawkins | 701/22 |
| 2013/0138311 A1* | 5/2013 | Kang et al. | 701/66 |
| 2013/0151109 A1* | 6/2013 | Waku et al. | 701/99 |
| 2013/0151113 A1* | 6/2013 | Chung | 701/102 |
| 2013/0179049 A1* | 7/2013 | Grieser et al. | 701/102 |
| 2013/0248294 A1* | 9/2013 | Kettunen et al. | 184/26 |

* cited by examiner

SYSTEM AND METHOD FOR CONTROLLING OIL PUMP

CROSS-REFERENCE TO RELATED APPLICATION

The present application claims priority to Korean Patent Application No. 10-2012-0110027 filed on Oct. 4, 2012, the entire contents of which is incorporated herein for all purposes by this reference.

BACKGROUND OF THE INVENTION

1. Field of the Invention

The present invention relates to an oil pump control system of a vehicle and an oil pump control method for a vehicle.

2. Description of Related Art

A mechanical variable oil pump applied to a vehicle engine lubrication system in the related art generally includes a driving gear for receiving power from an engine, a rotor rotated by rotation force of the driving gear and including a plurality of vanes, a pivot pin fixed to a housing, an outer ring for varying a volume of a pumping space formed between the vanes by pivoting based on the pivot pin, and a spring for elastically supporting the outer ring.

Since the mechanical variable oil pump varies the volume of the pumping space while moving the outer ring so as to maintain uniform oil pressure regardless of the number of revolutions of the engine, there is a problem in that efficiency of a diesel engine having a low revolution speed of the engine is deteriorated.

Further, in the mechanical variable oil pump in the related art, a variable time and the oil pressure establish a sort of trade-off relation, so that when the variable start point is low pressure, it is difficult to adjust oil pressure in a full load, and when the oil pressure in the full load is adjusted, pressure of the variable start point increases, thereby causing fuel efficiency to decrease.

In order to solve the problem, an electronic oil pump for electrically controlling an oil pump by several variables has been developed, but the electronic oil pump is also controlled without considering a load of an engine, so that there is a problem in that an engine lubrication system cannot be sufficiently protected from oil pressure under a high load condition.

Accordingly, the related art has a problem in that it is difficult to satisfy both an aspect of improving fuel efficiency and an aspect of protecting an engine lubrication system.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an oil pump control system and method capable of satisfying both an aspect of improving fuel efficiency and an aspect of protecting an engine lubrication system considering a load of an engine. In order to solve the aforementioned problem, an exemplary embodiment of the present invention provides an oil pump control method.

In an aspect of the present invention, an oil pump control method may include setting an initial target oil pressure of an oil pump based on a rotation speed of an engine or an oil temperature, determining a target torque or a target fuel quantity of the engine, determining a pressure compensation value by considering the determined target torque or target fuel quantity of the engine based on the initial target oil pressure, determining a final target oil pressure by adding the pressure compensation value to the initial target oil pressure, and feedback-controlling the oil pump so that current oil pressure measured in real time follows the final target oil pressure.

The initial target oil pressure is set from a target oil pressure curve preset according to the rotation speed of the engine or a target oil pressure map preset according to the rotation speed of the engine and the oil temperature.

The oil pump control method may further include determining whether the oil temperature is normally measured, and when the oil temperature is not normally measured, setting the determined target oil pressure as the final target oil pressure according to the target oil pressure curve.

The determining of the pressure compensation value may include determining an absolute value of a difference between a first target oil pressure determined from the target oil pressure curve and a second target oil pressure determined from the target oil pressure map, determining a pressure compensation factor from the target torque of the engine or the target fuel quantity of the engine, and determining the pressure compensation value by multiplying the absolute value by the pressure compensation factor.

The pressure compensation factor is determined front a torque-based compensation factor map preset according to the target torque of the engine and the rotation speed of the engine.

The torque-based compensation factor map is preset so that the final target oil pressure may have a value equal to or larger than that of the second target oil pressure and equal to or smaller than that of the first target oil pressure.

The pressure compensation factor is determined from a fuel quantity-based compensation factor map preset according to the target fuel quantity of the engine and the rotation speed of the engine.

The fuel quantity-based compensation factor map is preset so that the final target oil pressure may have a value equal to or larger than that of the second target oil pressure and equal to or smaller than that of the first target oil pressure.

In another aspect of the present invention, an oil pressure control system for controlling oil pressure of an electronic oil pump may include an engine rotation speed sensor configured to measure a rotation speed of an engine, an oil temperature sensor configured to measure an oil temperature, an oil pressure sensor configured to detect current oil pressure of the electronic oil pump, and a control unit configured to control the electronic oil pump based on information of the engine rotation speed, the oil temperature, and the oil pressure transmitted from the engine rotation speed sensor, the oil temperature sensor, and the oil pressure sensor, wherein the control unit controls the electronic oil pump by setting an initial target oil pressure of the electronic oil pump based on the rotation speed or the oil temperature, determining a target torque or a target fuel quantity of the engine, determining a pressure compensation value by considering the determined target torque or target fuel quantity of the engine based on the initial target oil pressure, determining a final target oil pressure by adding the pressure compensation value to the initial target oil pressure, and feedback-controlling the electronic oil pump so that current oil pressure measured in real time follows the final target oil pressure.

The initial target oil pressure is set from a target oil pressure curve preset according to the rotation speed of the engine or a target oil pressure map preset according to the rotation speed of the engine and the oil temperature.

The control unit determines whether the oil temperature is normally measured, and when the oil temperature is not normally measured, sets the determined target oil pressure as the final target oil pressure according to the target oil pressure curve.

The control unit determines the pressure compensation value by determining an absolute value of a difference between a first target oil pressure determined from the target oil pressure curve and a second target oil pressure determined from the target oil pressure map, determining a pressure compensation factor from the target torque of the engine or the target fuel quantity of the engine, and determining the pressure compensation value by multiplying the absolute value by the pressure compensation factor.

The pressure compensation factor is determined from a torque-based compensation factor map preset according to the target torque of the engine and the rotation speed of the engine.

The torque-based compensation factor map is preset so that the final target oil pressure may have a value equal to or larger than that of the second target oil pressure and equal to or smaller than that of the first target oil pressure.

The pressure compensation factor is determined from a fuel quantity-based compensation factor map preset according to the target fuel quantity of the engine and the rotation speed of the engine.

The fuel quantity-based compensation factor map is preset so that the final target oil pressure may have a value equal to or larger than that of the second target oil pressure and equal to or smaller than that of the first target oil pressure.

The control unit controls pressure of the oil pump by controlling a solenoid valve connected to the oil pump.

The oil pump control system and the oil pump control method according to the exemplary embodiment of the present invention may control oil pressure by reflecting a change in a load of an engine (change in a target torque or a target fuel quantity), so that it is possible to protect an engine lubrication system and improve fuel efficiency by decreasing oil pressure in a low load area.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings.

Figure 1:
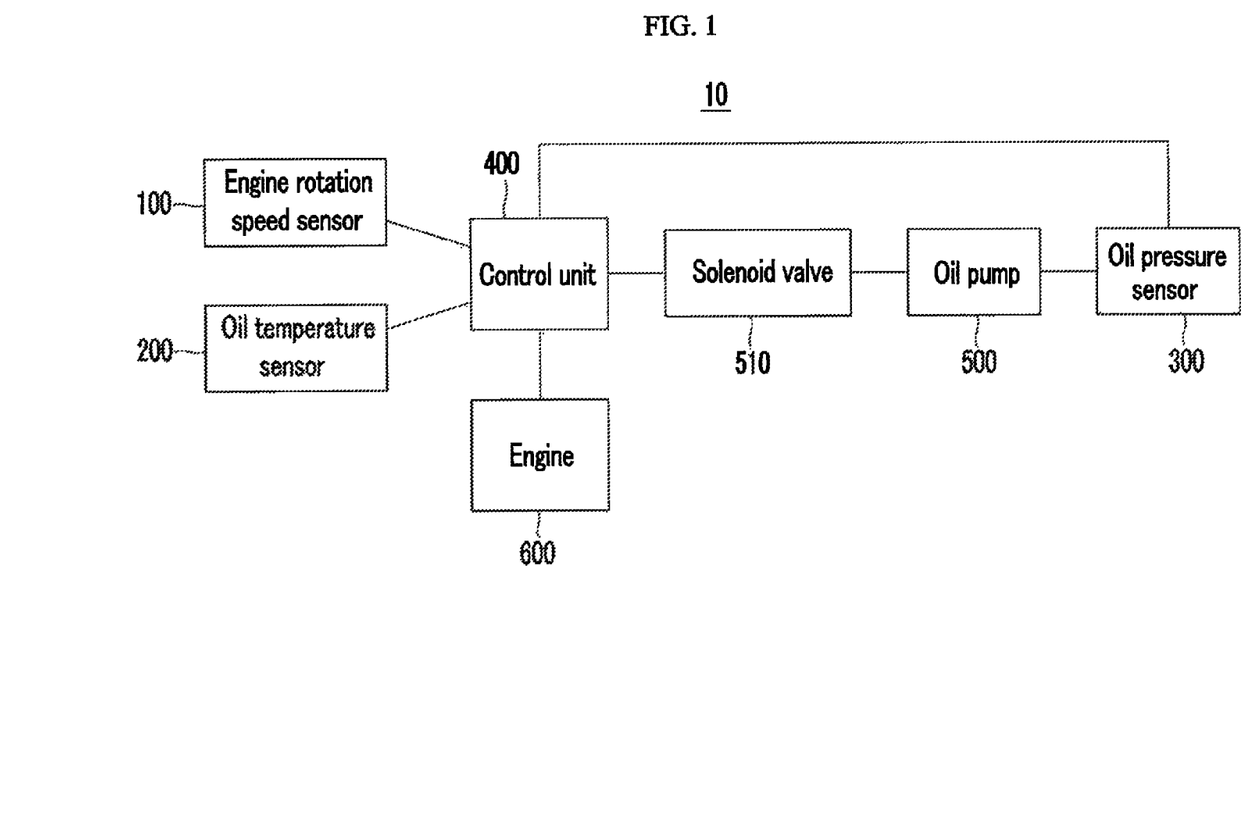
FIG. 1 is a configuration diagram of an oil pump control system according to various exemplary embodiments of the present invention.

FIG. 1 is a configuration diagram of a control system 10 of an oil pump 500 according to an exemplary embodiment of the present invention.

As illustrated in FIG. 1, the control system 10 of the oil pump 500 according to the exemplary embodiment of the present invention may include an engine rotation speed sensor 100, an oil temperature sensor 200, an oil pressure sensor 300, and a control unit 400.

The engine rotation speed sensor (engine speed sensor) 100 detects a rotation speed (rpm) of an engine and transmits detected rotation speed information of the engine to the control unit 400. The engine rotation speed sensor 100 detects the rotation speed of a rotation shaft of the engine, and various types of rotation speed sensors, such as an electric inductive rotation speed sensor, an ignition pulse rotation speed sensor, and an optical rotation speed sensor, as well as the mechanical rotation speed sensor, may be used as the engine rotation speed sensor 100. In addition, there is an engine rotation speed sensor using a hall element or a magnetoresistive element, and the exemplary embodiment of the present invention is not limited to a specific method, and may use any sensor if the sensor may detect the rotation speed of the engine.

The oil temperature sensor 200 measures a temperature of oil pumped by the oil pump 500 and transmits measured oil temperature information to the control unit 400.

The oil pressure sensor 300 measures pressure of oil pumped by the oil pump 500 and transmits measured current oil pressure information to the control unit 400.

The control unit 400 controls the oil pump based on the engine rotation speed information, the oil temperature information, and the oil pressure information transmitted from the engine rotation speed sensor 100, the oil temperature sensor 200, and the oil pressure sensor 300.

In one or multiple exemplary embodiments, the control unit 400 may be an engine control unit (ECU) of a vehicle.

In one or multiple exemplary embodiments, the control unit 400 may include a control module communicating with the ECU separately from the engine control unit (ECU) of the vehicle, and processing various operations for control of the oil pump 500 and the information transmitted from the engine rotation speed sensor 100, the oil temperature sensor 200, and the oil pressure sensor 300.

The control unit 400 controls the oil pump 500 considering a load of the engine 600. The load of the engine 600 may be indicated by a torque, that is, a target torque, required by the engine or a fuel quantity, that is, a target fuel quantity, required by the engine, and the target torque or the target fuel quantity of the engine 600 may be set in advance. The target torque or the target fuel quantity of the engine 600 may be pre-stored in the control unit 400 as a map table for driving conditions of the vehicle, such as the number of revolutions of the engine, an oil temperature, a speed of the vehicle, and an outside temperature in the control unit 400.

The control unit 400 sets a final target oil pressure considering the target torque or the target fuel quantity of the engine, as well as the engine rotation speed and the oil temperature, and feedback controls the oil pump 500 so as to follow the final target oil pressure.

In one or multiple exemplary embodiments, the control unit 400 may control the oil pump 500 by adjusting a solenoid valve 510 mounted to an engine lubrication circuit so as to reach a value of the final target oil pressure. The solenoid valve 510, which is a kind of electric valve, is opened/closed by using electric power of an electric coil.

The control unit 400 may be implemented as one or more processors operated by a set program, and the set program may be programmed so as to perform respective steps of a oil pump 500 control method according to the exemplary embodiment of the present invention.

Hereinafter, an oil pump control method according to an exemplary embodiment of the present invention will be described with reference to the drawings.

Figure 2:
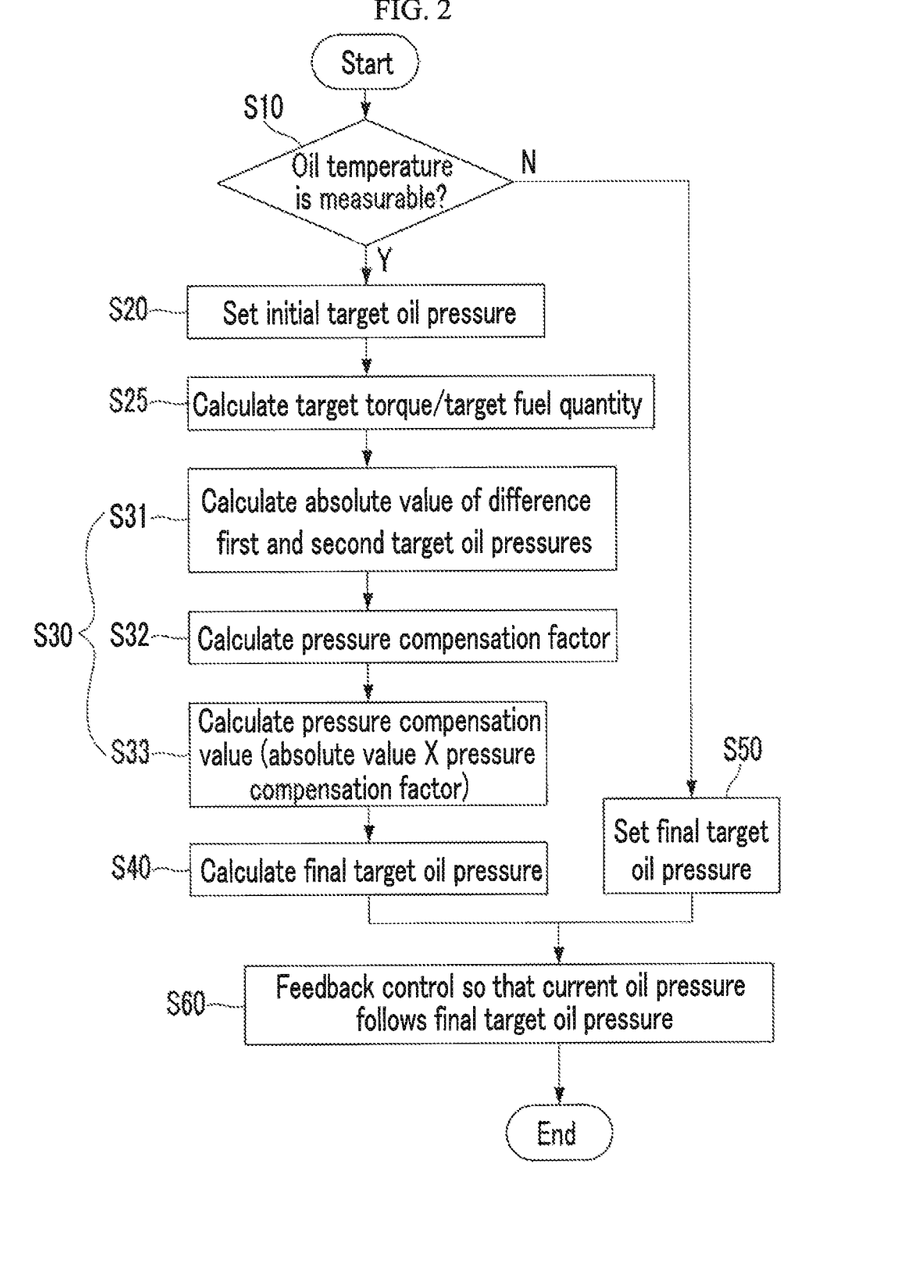
FIG. 2 is a flowchart of an oil pump control method according to various exemplary embodiments of the present invention.

FIG. 2 is a flowchart of the oil pump control method according to an exemplary embodiment of the present invention.

As illustrated in FIG. 2, the control unit 400 first determines whether an oil temperature may be normally measured (S10). The control unit 400 may determine whether the oil temperature may be normally measured by determining whether a problem occurs in the oil temperature sensor 200.

When the oil temperature may be normally measured, the control unit 400 sets an initial target oil pressure based on a target oil pressure curve or a target oil pressure map (S20). Here, in the target oil pressure curve, the target oil pressure may be preset by using rotation speeds of the engine as variables as illustrated in FIGS. 3 to 6, and in the target oil pressure map, the target oil pressure may be preset by using rotation speeds of the engine and oil temperatures as variables.

In the target oil pressure curve, the target oil pressure is set only with the rotation speed of the engine in preparation of failure of the oil temperature sensor 200, so that the oil pressure may be set to be slightly high so as to stably operate a lubrication system of the engine. Here, target oil pressure set by the target oil pressure curve is defined as a first target oil pressure P1.

Contrary to this, in the target oil pressure map, oil pressure may be set to be lower than that of the target oil pressure curve in order to additionally improve fuel efficiency in a low load area in which an oil temperature of the engine is low. Here, target oil pressure set by the target oil pressure map is defined as a second target oil pressure P2.

Accordingly, the initial target oil pressure may be any one of the first target oil pressure P1 and the second target oil pressure P2.

Further, the control unit 400 calculates a target torque or a target fuel quantity of the engine according to a driving condition of the vehicle (S25). The target torque or the target fuel quantity of the engine may be pre-stored in the control unit 400 as a map table for driving conditions of the vehicle, such as the number of revolutions of the engine, an oil temperature, a speed of the vehicle, and an outside temperature. Accordingly, the control unit 400 may calculate the target torque or the target fuel quantity of the engine according to the current driving condition of the vehicle in real time by using the map table.

Next, the control unit 400 calculates a pressure compensation value P4 by considering the target torque or the target fuel quantity of the engine based on the set initial target oil pressure (S30).

In one or multiple exemplary embodiments, step S30 will be described in more detail below.

First, the control unit 400 calculates an absolute value (|P1−P2|=P3) of a difference of the first target oil pressure P1 calculated from the target oil pressure curve and the second target oil pressure P2 calculated from the target oil pressure map (S31).

Then, the control unit 400 may calculate a pressure compensation factor F1 from the target torque of the engine or the target fuel quantity of the engine (S32), and calculate the pressure compensation value (P4=P3*F1) by multiplying the absolute value P3 by the pressure compensation factor F1 (S33).

Figure 3:
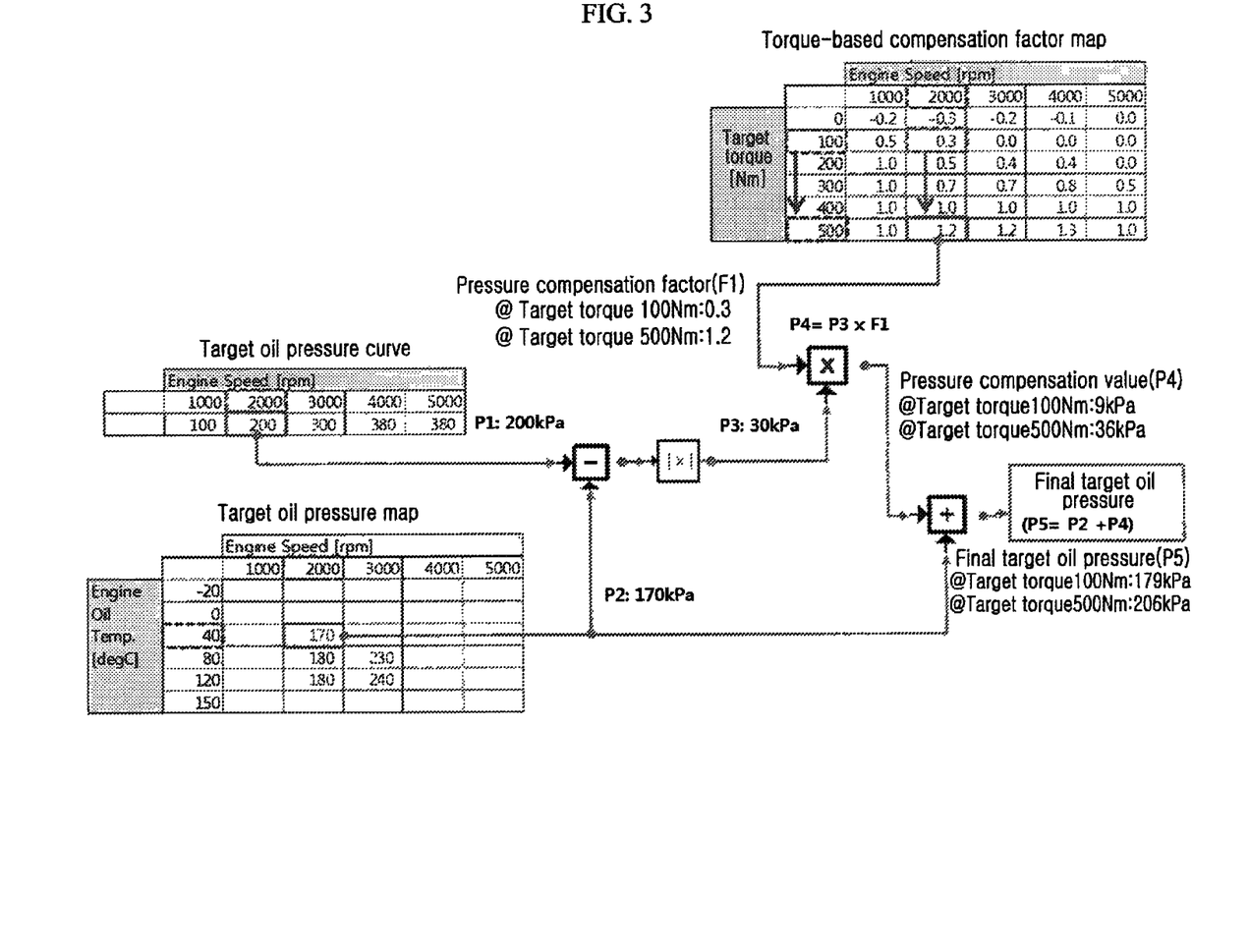
FIG. 3 is a schematic diagram of a process of setting a final target pressure according to various exemplary embodiments of the present invention.
Figure 4:
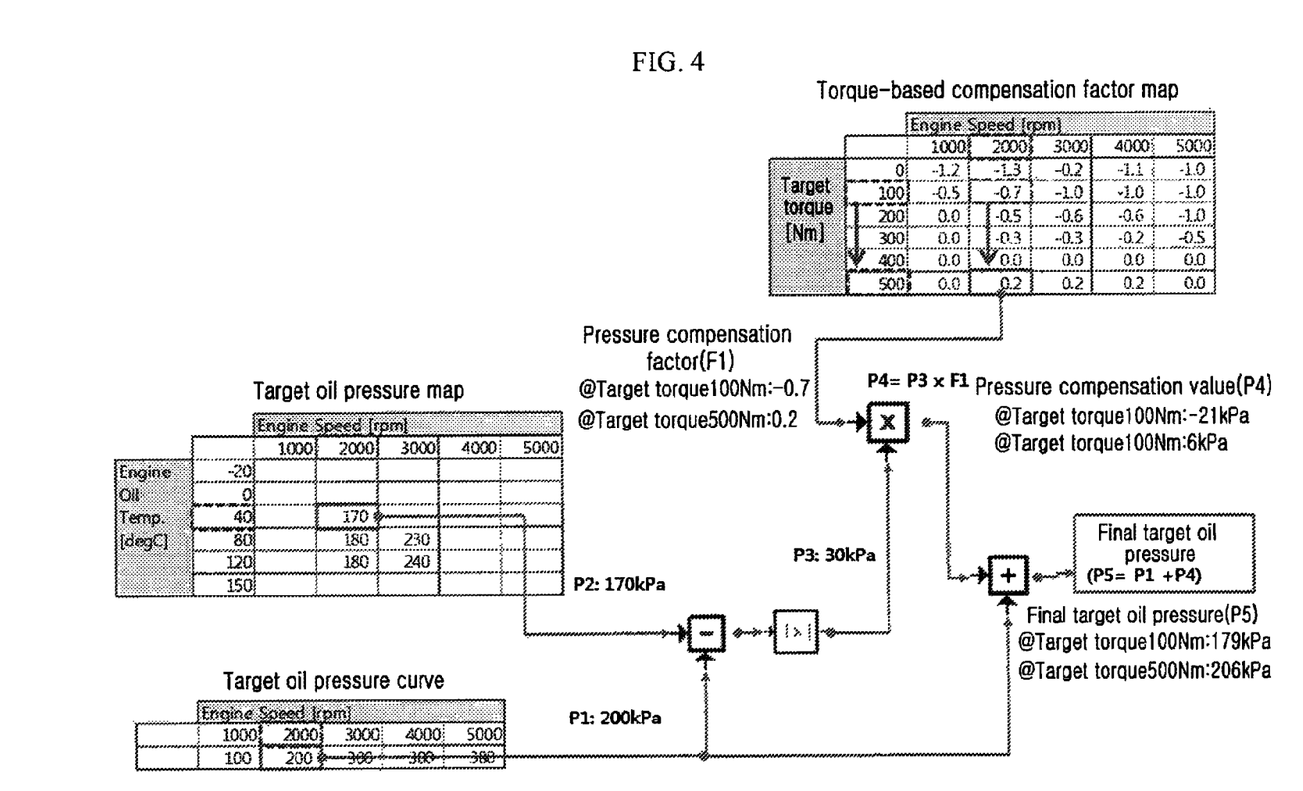
FIG. 4 is a schematic diagram of a process of setting a final target pressure according to various exemplary embodiments of the present invention.

In one or multiple exemplary embodiments, the pressure compensation factor F1 in step S32 may be calculated from a torque-based compensation factor map preset according to the target torque (Nm) of the engine and the rotation speed (rpm) of the engine as illustrated in FIGS. 3 and 4. In this case, the torque-based compensation factor map may be preset so that the final target oil pressure P5 has a value equal to larger than that of the second target oil pressure P2 and equal to or smaller than that of the first target oil pressure P1. In one or multiple exemplary embodiments, when the first target oil pressure P1 calculated by the target oil pressure curve has a value equal to or larger than that of the second target oil pressure P2 calculated by the target oil pressure map, the respective pressure compensation factors F1 of the torque-based compensation factor map may be preset so that the final target oil pressure P5 is equal to or higher than the second target oil pressure P2 and equal to or lower than the first target oil pressure P1.

Figure 5:
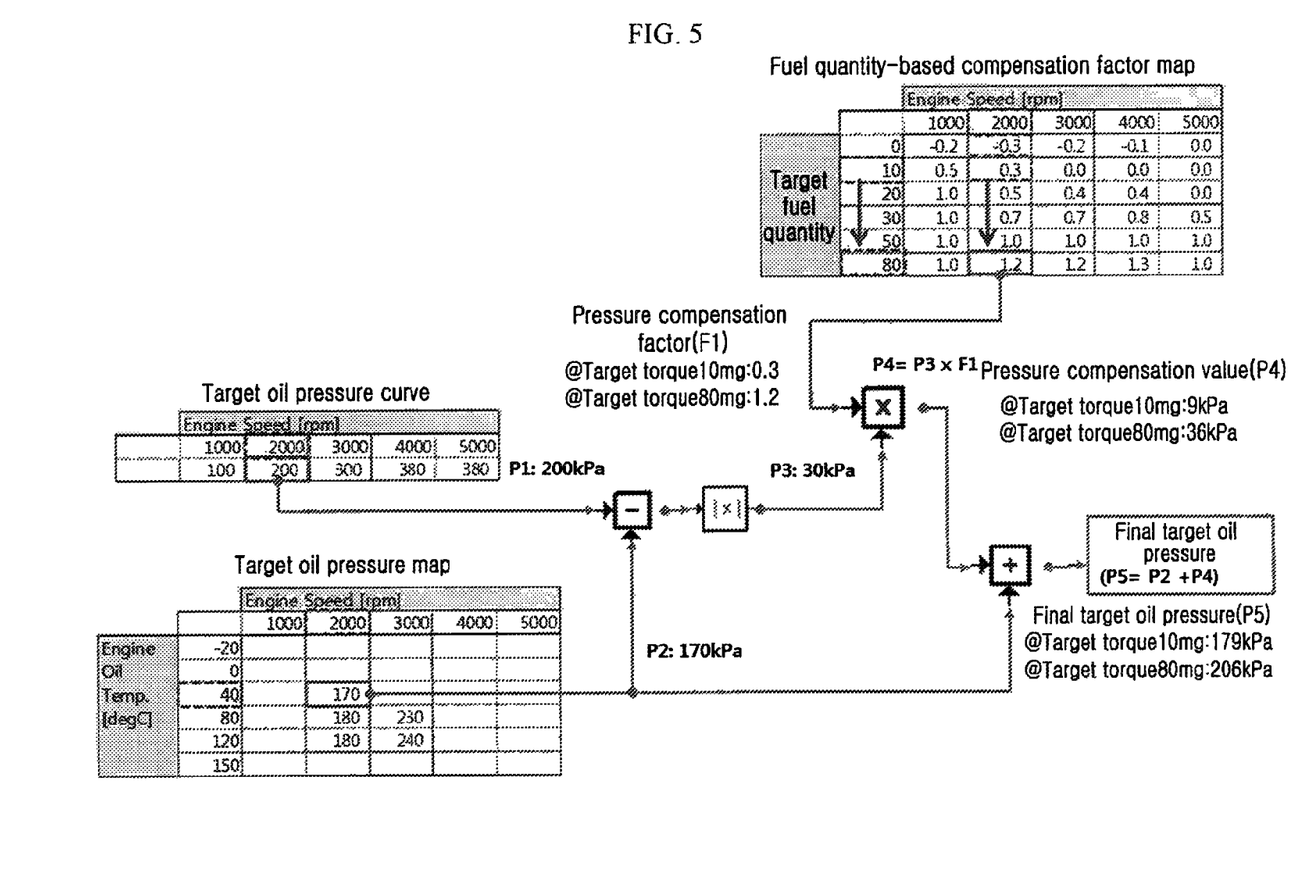
FIG. 5 is a schematic diagram of a process of setting a final target pressure according to various exemplary embodiments of the present invention.
Figure 6:
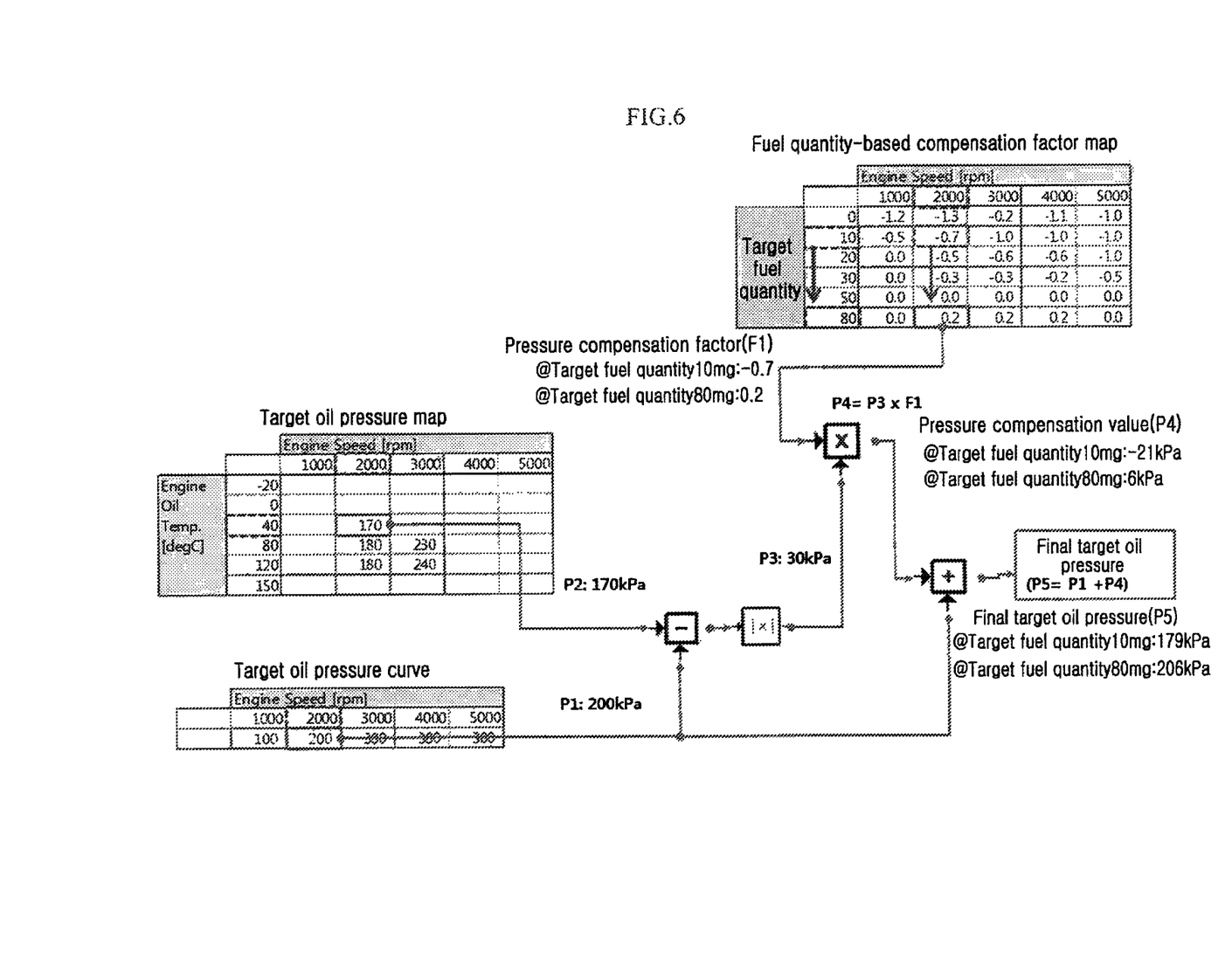
FIG. 6 is a schematic diagram of a process of setting a final target pressure according to various exemplary embodiments of the present invention.

In one or multiple exemplary embodiments, the pressure compensation factor F1 in step S32 may be calculated from a fuel quantity-based compensation factor map preset according to the target fuel quantity (mg/st, milligram/stroke) of the engine and the rotation speed (rpm) of the engine as illustrated in FIGS. 5 and 6. In this case, the fuel quantity-based compensation factor map may be set such that the final oil pressure P5 has a value equal to or larger than that of the second target oil pressure P2 and equal to or less than that of the first target oil pressure P1. In one or multiple exemplary embodiments, when the first target oil pressure P1 calculated by the target oil pressure curve has a value equal to or larger than that of the second target oil pressure P2 calculated by the target oil pressure map, the respective pressure compensation factors F1 of the fuel quantity-based compensation factor map may be preset so that the final target oil pressure P5 is equal to or higher than the second target oil pressure P2 and equal to or lower than the first target oil pressure P1.

Next, the control unit 400 calculates the final target oil pressure P5 by adding the pressure compensation value P4 to the initial target oil pressure P1 or P2.

In the meantime, when the oil temperature may not be normally measured in step S10, the final target oil pressure P5 is directly set based on the target oil pressure curve (S50). Since the oil temperature may not be normally measured, it is impossible to use the target oil pressure map and calculate the pressure compensation value P4, so that the first target oil pressure P1 set according to the target oil pressure curve is set as the final target oil pressure (P5=P1).

Next, the control unit 400 feedback controls the oil pump 500 so that current oil pressure measured by the oil pressure sensor 300 in real time follows the final target oil pressure P5 (S50). As described above, the control unit 400 may control the oil pump 500 by adjusting the solenoid valve 510.

FIG. 3 is a schematic diagram illustrating a process of setting the final target pressure P5 according to a first exemplary embodiment of the present invention.

According to the first exemplary embodiment of the present invention, the second target oil pressure P2 is set as the initial target oil pressure, and the torque-based compensation factor map based on the target torque of the engine is applied. For the convenience of description, it is assumed that the rotation speed of the engine is 2,000 rpm, the oil temperature is 40° C., and the target torque is 100 Nm.

Referring to FIG. 3, first, the oil temperature (40° C.) is normally measured (S10). Then, the second target oil pressure (P2=170 kPa) is set as the initial target oil pressure (S20). The target torque is 100 Nm (S25). The pressure compensation value P4 is 9 kPa when the target torque is 100 Nm (S30). Particularly, the pressure compensation value P4 is obtained from an equation (P3=|P1−P2|=|200−170|=30 kPa) of step S31 and an equation (P4=P3*F1=30*0.3=9 kPa) of steps S32 and S33 described above.

Accordingly, in the first exemplary embodiment of the present invention, the final target oil pressure P5 becomes 179 kPa by adding the pressure compensation value (P4=9 kPa) to the target oil pressure (P2=170 kPa).

When other conditions are the same in FIG. 3 but the target torque is 500 Nm, by the same calculation method, the final target oil pressure P5 becomes 206 kPa, and when the target torque is 0 Nm, the final target oil pressure P5 becomes 161 kPa.

FIG. 4 is a schematic diagram illustrating a process of setting the final target pressure P5 according to a second exemplary embodiment of the present invention. According to the second exemplary embodiment of the present invention, the first target oil pressure P1 is set as the initial target oil pressure, and the torque-based compensation factor map based on the target torque of the engine is applied. For the convenience of description, it is assumed that the rotation speed of the engine is 2,000 rpm, the oil temperature is 40° C., and the target torque is 100 Nm.

Referring to FIG. 4, first, an oil temperature (40° C.) is normally measured (S10). Then, the first target oil pressure (P1=200 kPa) is set as the initial target oil pressure (S20). The target torque is 100 Nm (S25). The pressure compensation value P4 is −21 kPa when the target torque is 100 Nm (S30). Particularly, the pressure compensation value P4 is obtained from the equation (P3=|P1−P2|=|200−170|=30 kPa) of step S31 and an equation (P4=P3*F1=30*(−0.7)=−21 kPa) of steps S32 and S33 described above.

Accordingly, in the second exemplary embodiment of the present invention, the final target oil pressure P5 becomes 179 kPa by adding the pressure compensation value (P4=−21 kPa) to the target oil pressure (P1=200 kPa).

When other conditions are the same in FIG. 4 but the target torque is 500 Nm, by the same calculation method, the final target oil pressure P5 becomes 206 kPa, and when the target torque is 0 Nm, the final target oil pressure P5 becomes 161 kPa.

Accordingly, according to the first and second exemplary embodiments of the present invention, the oil pressure may be controlled by reflecting a change in the load of the engine (change in the target torque), so that the engine lubrication system may be protected, and an additional fuel efficiency effect may be achieved by reducing the oil pressure in the low load area.

FIG. 5 is a schematic diagram illustrating a process of setting the final target pressure P5 according to a third exemplary embodiment of the present invention. According to the third exemplary embodiment of the present invention, the second target oil pressure P2 is set as the initial target oil pressure, and the fuel quantity-based compensation factor map based on the target fuel quantity of the engine is applied. For the convenience of description, it is assumed that the rotation speed of the engine is 2,000 rpm, the oil temperature is 40° C., and the target fuel quantity is 10 mg/st.

Referring to FIG. 5, first, the oil temperature (40° C.) is normally measured (S10). Then, the second target oil pressure (P2=170 kPa) is set as the initial target oil pressure (S20). The target fuel quantity is 10 mg/st (S25). The pressure compensation value P4 is 9 kPa when the target fuel quantity is 10 mg/st (S30). Particularly, the pressure compensation value P4 is obtained from the equation (P3=|P1−P2|=|200−170|=30 kPa) of step S31 and the equation (P4=P3*F1=30*0.3=9 kPa) of steps S32 and S33 described above.

Accordingly, in the third exemplary embodiment of the present invention, the final target oil pressure P5 becomes 179 kPa by adding the pressure compensation value (P4=9 kPa) to the target oil pressure (P2=170 kPa).

When other conditions are the same in FIG. 5 but the target fuel quantity is 80 mg/st, by the same calculation method, the final target oil pressure P5 becomes 206 kPa, and when the target fuel quantity is 0 mg/st, the final target oil pressure P5 becomes 161 kPa.

FIG. 6 is a schematic diagram illustrating a process of setting the final target pressure P5 according to a fourth exemplary embodiment of the present invention. According to the fourth exemplary embodiment of the present invention, the first target oil pressure P1 is set as the initial target oil pressure, and the fuel quantity-based compensation factor map based on the target fuel quantity of the engine is applied. For the convenience of description, it is assumed that the rotation speed of the engine is 2,000 rpm, the oil temperature is 40° C., and the target fuel quantity is 10 mg/st.

Referring to FIG. 6, first, an oil temperature (40° C.) is normally measured (S10). Then, the first target oil pressure (P1=200 kPa) is set as the initial target oil pressure (S20). The target fuel quantity is 10 mg/st (S25). The pressure compensation value P4 is −21 kPa when the target fuel quantity is 10 mg/st (S30). Particularly, the pressure compensation value P4 is obtained from the equation (P3=|P1−P2|=|200−170|=30 kPa) of step S31 and the equation (P4=P3*F1=30*−0.7=−21 kPa) of steps S32 and S33 described above.

Accordingly, in the fourth exemplary embodiment of the present invention, the final target oil pressure P5 becomes 179 kPa by adding the pressure compensation value (P4=−21 kPa) to the target oil pressure (P1=200 kPa).

When other conditions are the same in FIG. 6 but the target fuel quantity is 80 mg/st, by the same calculation method, the final target oil pressure P5 becomes 206 kPa, and when the target fuel quantity is 0 mg/st, the final target oil pressure P5 becomes 161 kPa.

Accordingly, according to the third and fourth exemplary embodiments of the present invention, the oil pressure may be controlled by reflecting a change in the load of the engine (change in the target fuel quantity), so that the engine lubrication system may be protected, and an additional fuel efficiency effect may be achieved by reducing the oil pressure in the low load area.

Figure 7:
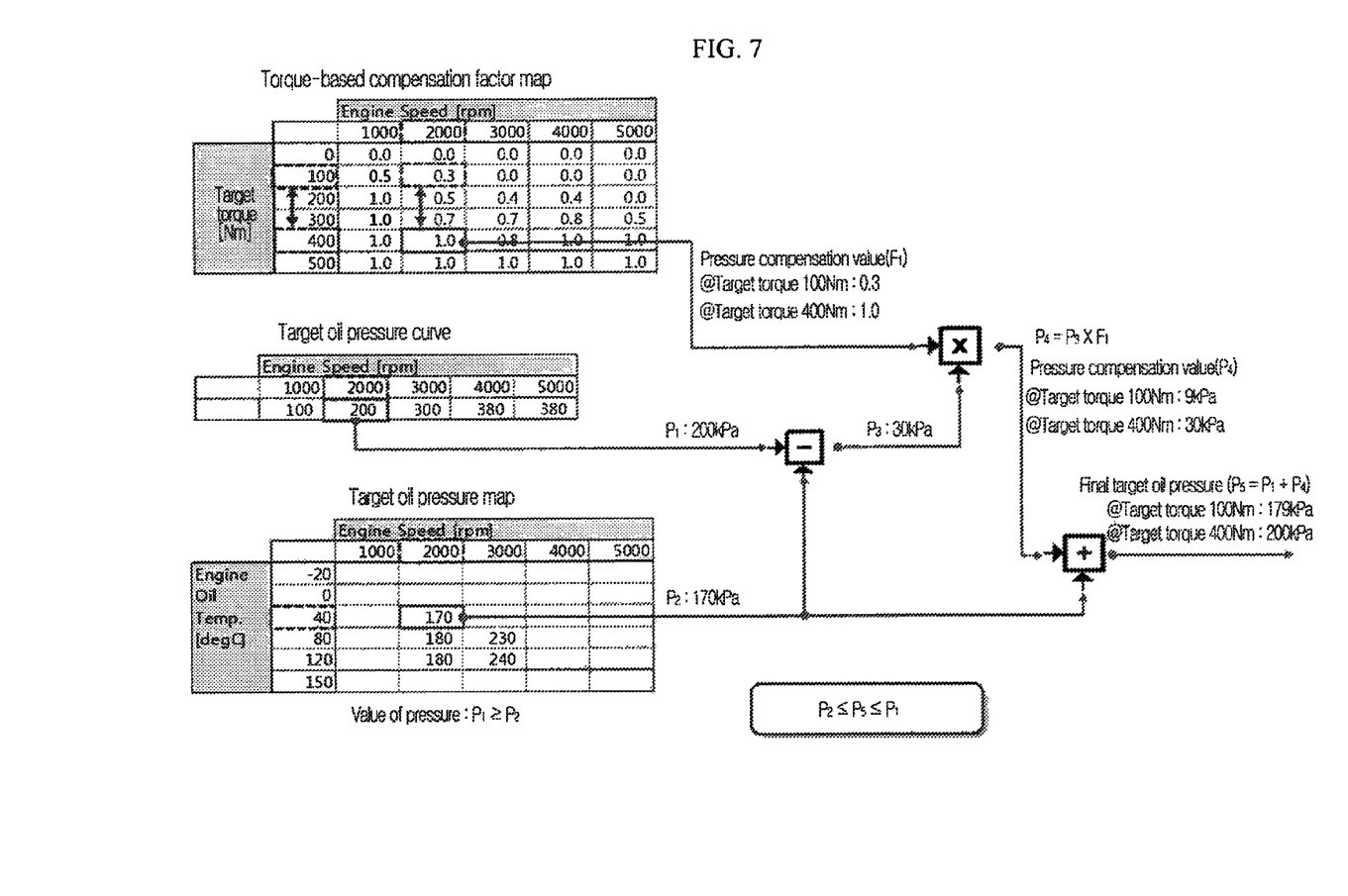
FIG. 7 is a schematic diagram of a process of setting a final target pressure according to various exemplary embodiments of the present invention.

FIG. 7 is a schematic diagram illustrating a process of setting the final target pressure P5 according to a fifth exemplary embodiment of the present invention. Similar to the first exemplary embodiment, according to the fifth exemplary embodiment of the present invention, the second target oil pressure P2 is set as the initial target oil pressure, the torque-based compensation factor map based on the target torque of the engine is applied, and it is assumed that the rotation speed of the engine is 2,000 rpm and the oil temperature is 40° C.

However, in the fifth exemplary embodiment of the present invention, the pressure compensation factors F1 of the torque-based compensation factor map are set so that the final target oil pressure P5 is equal to or higher than the second target oil pressure P2 and equal to or lower than the first target oil pressure P1.

As illustrated in the torque-based pressure compensation factor map of FIG. 7, when the target torques are 400 Nm and 500 Nm, the pressure compensation factors F1 are all 1.0 and the final target oil pressure P5 is 200 kPa.

Accordingly, it can be seen that when the torque-based pressure compensation factor map according to the fifth exemplary embodiment of the present invention is applied, the final target oil pressure P5 is equal to or higher than the second target oil pressure P2 and equal to or lower than the first target oil pressure P1.

In the fifth exemplary embodiment of the present invention, the torque-based pressure compensation factor map has been described as an example, but the process may be identically applied to the fuel quantity-based pressure compensation factor map according to the third or fourth exemplary embodiment of the present invention. That is, the pressure compensation factors F1 of the fuel quantity-based pressure compensation factor map may also be preset so that the final target oil pressure P5 is equal to or higher than the second target oil pressure P2 and equal to or lower than the first target oil pressure P1.

Figure 8:
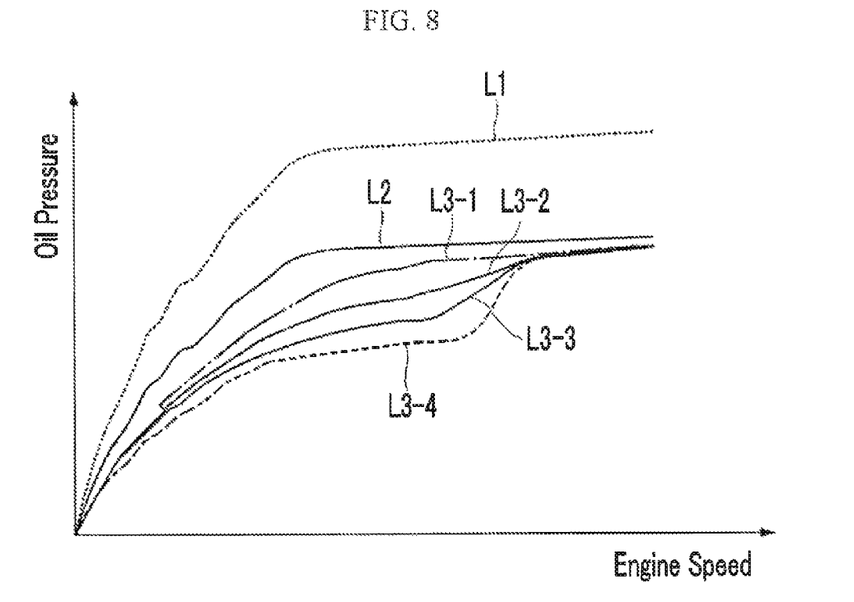
FIG. 8 is a graph of comparison of oil pressure lines between the related art and the present invention.

FIG. 8 is a graph of comparison between the present invention and the related art.

In FIG. 8, L1 indicates an oil pressure line by the mechanical oil pump in the related art, L2 indicates an oil pressure line by the electronic oil pump in the related art, and L3-1 to L3-4 indicate oil pressure lines by the oil pump control method according to the exemplary embodiment of the present invention.

As illustrated in FIG. 8, it can be seen that the oil pressure lines L3-1 to L3-4 according to the exemplary embodiment of the present invention are positioned at lower positions than those of the oil pressure line 1I by the mechanical oil pump in the related art and the oil pressure line L2 by the electric oil pump in the related art according to the comparison. That is, according to the exemplary embodiment of the present invention, fuel efficiency may be improved by additionally decreasing the oil pressure compared to the related art. Further, the oil pressure may be controlled by actively changing the oil pressure between L3-1 to L3-4 by reflecting the load of the engine, so that it is possible to protect the lubrication system of the engine.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof it is intended that the scope of the invention be defined by the Claims appended hereto and their equivalents.

What is claimed is:

1. An oil pump control method, comprising:
   setting an initial target oil pressure of an oil pump based on a rotation speed of an engine or an oil temperature;
   determining a target torque or a target fuel quantity of the engine;
   determining a pressure compensation value by considering the determined target torque or target fuel quantity of the engine based on the initial target oil pressure;
   determining a final target oil pressure by adding the pressure compensation value to the initial target oil pressure; and
   feedback-controlling the oil pump so that current oil pressure measured in real time follows the final target oil pressure.

2. The oil pump control method of claim 1, wherein:
   the initial target oil pressure is set from a target oil pressure curve preset according to the rotation speed of the engine or a target oil pressure map preset according to the rotation speed of the engine and the oil temperature.

3. The oil pump control method of claim 2, further comprising:
   determining whether the oil temperature is normally measured; and
   when the oil temperature is not normally measured, setting the determined target oil pressure as the final target oil pressure according to the target oil pressure curve.

4. The oil pump control method of claim 1, wherein:
   the determining of the pressure compensation value comprises:
   determining an absolute value of a difference between a first target oil pressure determined from the target oil pressure curve and a second target oil pressure determined from the target oil pressure map;
   determining a pressure compensation factor from the target torque of the engine or the target fuel quantity of the engine; and
   determining the pressure compensation value by multiplying the absolute value by the pressure compensation factor.

5. The oil pump control method of claim 4, wherein:
   the pressure compensation factor is determined from a torque-based compensation factor map preset according to the target torque of the engine and the rotation speed of the engine.

6. The oil pump control method of claim 5, wherein:
   the torque-based compensation factor map is preset so that the final target oil pressure has a value equal to or larger than that of the second target oil pressure and equal to or smaller than that of the first target oil pressure.

7. The oil pump control method of claim 4, wherein:
the pressure compensation factor is determined from a fuel quantity-based compensation factor map preset according to the target fuel quantity of the engine and the rotation speed of the engine.

8. The oil pump control method of claim 7, wherein:
the fuel quantity-based compensation factor map is preset so that the final target oil pressure has a value equal to or larger than that of the second target oil pressure and equal to or smaller than that of the first target oil pressure.

9. An oil pressure control system for controlling oil pressure of an electronic oil pump, comprising:
   an engine rotation speed sensor configured to measure a rotation speed of an engine;
   an oil temperature sensor configured to measure an oil temperature;
   an oil pressure sensor configured to detect current oil pressure of the electronic oil pump; and
   a control unit configured to control the electronic oil pump based on information of the engine rotation speed, the oil temperature, and the oil pressure transmitted from the engine rotation speed sensor, the oil temperature sensor, and the oil pressure sensor,
   wherein the control unit controls the electronic oil pump by setting an initial target oil pressure of the electronic oil pump based on the rotation speed or the oil temperature; determining a target torque or a target fuel quantity of the engine; determining a pressure compensation value by considering the determined target torque or target fuel quantity of the engine based on the initial target oil pressure; determining a final target oil pressure by adding the pressure compensation value to the initial target oil pressure; and feedback-controlling the electronic oil pump so that current oil pressure measured in real time follows the final target oil pressure.

10. The oil pressure control system of claim 9, wherein the initial target oil pressure is set from a target oil pressure curve preset according to the rotation speed of the engine or a target oil pressure map preset according to the rotation speed of the engine and the oil temperature.

11. The oil pump control method of claim 10, wherein the control unit determines whether the oil temperature is normally measured, and when the oil temperature is not normally measured, sets the determined target oil pressure as the final target oil pressure according to the target oil pressure curve.

12. The oil pump control method of claim 9, wherein the control unit determines the pressure compensation value by:
   determining an absolute value of a difference between a first target oil pressure determined from the target oil pressure curve and a second target oil pressure determined from the target oil pressure map;
   determining a pressure compensation factor from the target torque of the engine or the target fuel quantity of the engine; and
   determining the pressure compensation value by multiplying the absolute value by the pressure compensation factor.

13. The oil pump control method of claim 12, wherein the pressure compensation factor is determined from a torque-based compensation factor map preset according to the target torque of the engine and the rotation speed of the engine.

14. The oil pump control method of claim 13, wherein the torque-based compensation factor map is preset so that the final target oil pressure has a value equal to or larger than that of the second target oil pressure and equal to or smaller than that of the first target oil pressure.

15. The oil pump control method of claim 12, wherein the pressure compensation factor is determined from a fuel quantity-based compensation factor map preset according to the target fuel quantity of the engine and the rotation speed of the engine.

16. The oil pump control method of claim 15, wherein the fuel quantity-based compensation factor map is preset so that the final target oil pressure has a value equal to or larger than that of the second target oil pressure and equal to or smaller than that of the first target oil pressure.

17. The oil pressure control system of claim 9, wherein the control unit controls pressure of the oil pump by controlling a solenoid valve connected to the oil pump.

\* \* \* \* \*